March 1, 1955 H. A. TOULMIN, JR Re. 23,958
METHOD AND APPARATUS FOR DEHYDRATION
Original Filed Oct. 19, 1949
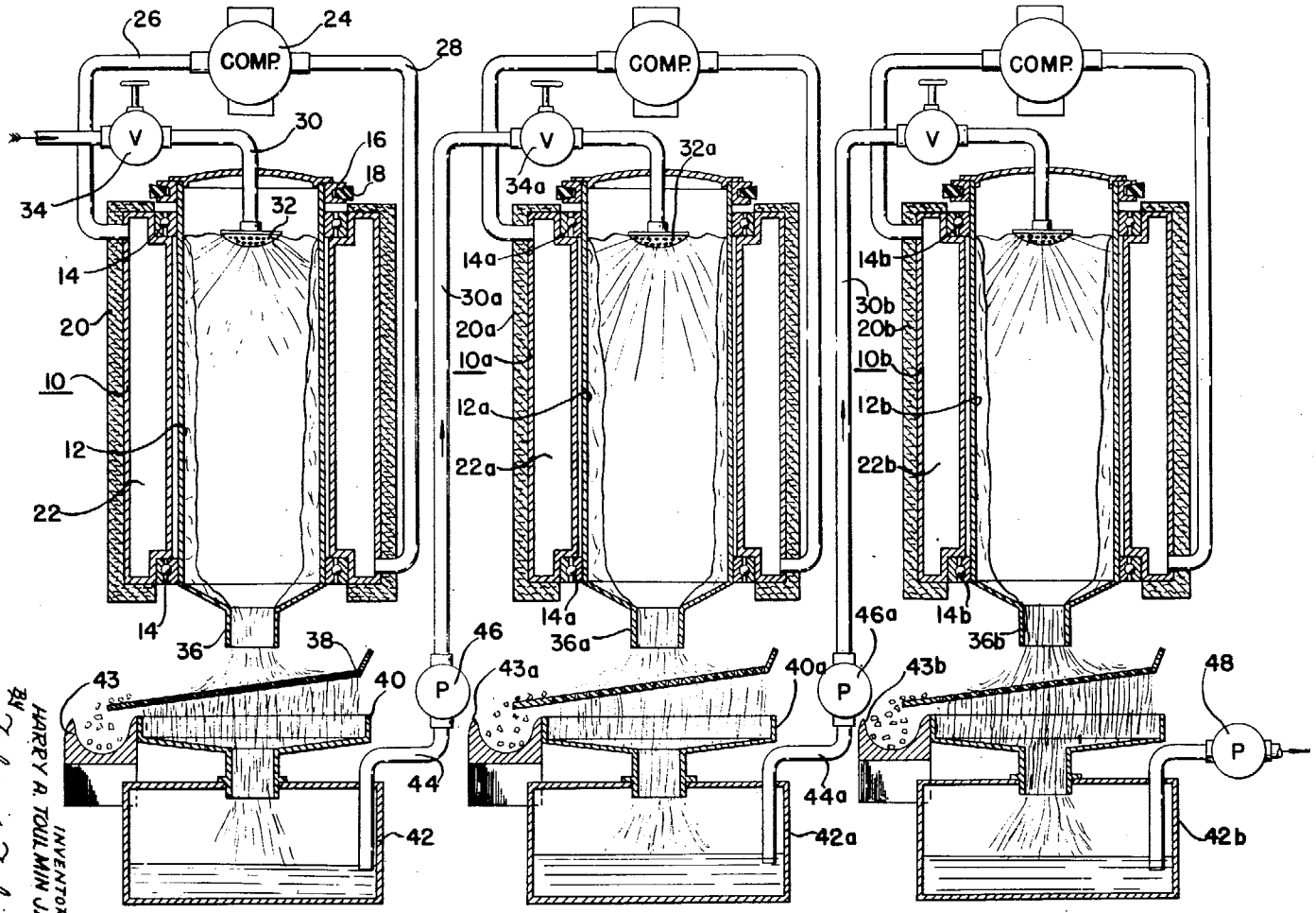
INVENTOR
HARRY A. TOULMIN JR.
BY Toulmin & Toulmin
ATTORNEYS United States Patent Office Re. 23,958
Reissued Mar. 1, 1955

23,958

METHOD AND APPARATUS FOR DEHYDRATION

Harry A. Toulmin, Jr., Dayton, Ohio, assignor to The Commonwealth Engineering Company of Ohio, Dayton, Ohio, a corporation of Ohio Original No. 2,628,485, dated February 17, 1953, Serial No. 122,239, October 19, 1949. Application for reissue August 3, 1954, Serial No. 447,697

13 Claims. (Cl. 62—124)

Matter enclosed in heavy brackets [ ] appears in the original patent but forms no part of this reissue specification; matter printed in italics indicates the additions made by reissue

This invention relates to a method and apparatus for dehydration, especially the dehydration of fruit and vegetable juices and the like.

The dehydration of fruit and vegetable juices and similar substances is of importance commercially, because it enables producers to utilize fully ripened fruits and vegetables, to extract the juices therefrom, and then to package them in compact containers in which they are shipped to the market and eventually sold to the consumer. The reduction of such juices to a relatively small volume by dehydration not only makes the juices easier to preserve, but also reduces their bulk so they will occupy less space, and thus reduces the cost of shipping and storing and makes it more convenient for the purchaser to carry them home and store them.

Prior art methods of dehydrating such juices to the desired degree have generally been accompanied by a heating of the liquid or the combination of heat and vacuum applied thereto in order to cause evaporation of a certain amount of the water therefrom. While this procedure has been successful in effecting a dehydration of the juices, it is also accompanied by an objectionable change in the flavor due to a loss of certain flavoring substances from the juices. Also, the use of heat in connection with such juices destroys the vitamin content to a large degree, thereby detracting from the value of the juices and making them less desirable as foods than fresh juices.

The result of dehydrating juices according to the prior art has been that when such juices are reconstituted to their original dilution by the addition of water, they do not have a taste as good as that of fresh juices, and are thus not attractive to the consumer, and the sale of dehydrated substances has, accordingly, been less than desirable.

One of the objects of this invention is to provide a method and apparatus for effecting the dehydration of edible juices in such a manner that the objectionable changes in taste and constitution referred to above are avoided.

Another object of this invention is to provide a method and apparatus for dehydrating juices and the like in which the application of heat to the juices is avoided, thereby preserving the original vitamin and flavoring material content of the juices so that when they are reconstituted, they taste like fresh juices.

A particular object of this invention is to provide a method and apparatus for effecting the dehydration of fruit juices and the like which can be carried out in a substantially continuous cycle, thereby resulting in a more uniform product than has heretofore been possible, and being commercially a process having definite advantages over the hitherto used batch processes.

It is also an object of this invention to provide an arrangement for dehydrating fruit juices and the like in which the water is removed from the juices in the form of ice, and in such a manner that there is very little carry-out of the juices being concentrated with the ice, thereby insuring a high degree of yield and a commercially practical process.

A still further object is the provision of a process for dehydrating juices which is flexible to adapt it to different conditions so the degree of dehydration of the juices being treated can be varied at will.

It is also an object of this invention to provide a dehydration method and apparatus for fruit juices and the like which results in the rapid concentration of the juices, thereby insuring a high degree of yield and a commercially practical process.

These and other objects and advantages of this invention will become more apparent during the following description which makes reference to the accompanying drawing.

In general, my new process is carried out by spraying the juice on a generally vertical refrigerated surface so water freezes out of the juice while the concentrate runs off, and periodically removing the ice from the surface by flash heating the surface. This is carried out through as many stages as are necessary to effect the desired concentration of the juices.

In practice, I have found satisfactory an apparatus comprising an arrangement whereby the liquid to be concentrated is sprayed into the top of a vertically disposed rotating drum or cylinder, the said drum being refrigerated so that the spray has a tendency to freeze on the sides thereof. As is well known, when a liquid substance having water therein freezes, the ice crystals which form will be pure ice, free of the material entrained in the water, unless the ice freezes around said material.

By breaking up the substance to be dehydrated into a rather fine spray, the ice crystals have a chance to form entirely free of the other substances in the juice, and each of these crystals forms a nucleus on which grows a larger crystal of pure ice.

The remainder of the juice, differing from the original juice only in water content, drains off from the ice crystals thus formed, and is discharged from the bottom of the said drum as a liquid more concentrated than that sprayed into the drum at the top.

The juice discharged from the bottom of the drum preferably falls on an inclined perforated drainboard, so the juices can pass therethrough to a receiver tank, while any ice crystals entrained in the liquid will be delivered on the lower edge of the drainboard to any suitable receiving trough.

Referring now to the drawing somewhat more in detail, the structure shown therein comprises an arrangement for dehydrating juices through a three-stage process. The apparatus associated with each of the stages is substantially identical, except that each thereof operates at a successively lower temperature in order to bring about crystallization of the water when the juices are sprayed into the associated drum.

The first stage of the system comprises the apparatus at the left-hand end of the view, and which comprises a container 10 within which is mounted the rotary cylinder or drum 12 having its axis extending substantially vertically so the wall portions thereof are also substantially vertical. The drum 12 is supported on the anti-friction bearings 14 at the top and bottom thereof, and the V-belt sheave 16 may be employed for driving the drum by means of the V-belt 18 which passes over a suitable motor driven pulley.

The outer part of container 10 is covered by the heat insulating material 20 so that the space 22 inside the container and surrounding the drum 12 can be supplied with a refrigerated fluid in order to chill the drum to the temperature at which ice crystals will form on its inner surface. For so supplying refrigerant to the space 22 there may be provided the mechanism generally indicated at 24 and which is connected with the upper end of space 22 by conduit 26, and with the lower end of the said space by conduit 28. It will be understood that any suitable mechanism for circulating chilled refrigerant to the space 22 would be satisfactory for producing the proper drum temperature.

The juice to be concentrated is supplied to the upper end of the drum from a conduit 30 through a spray head 32 which distributes the juice as a fine spray about the interior of the drum and generally toward the upper end thereof. The amount of juice supplied to the drum is regulated by a valve 34 so that the juice is supplied to the drum at the proper rate to permit formation of ice on the drum, but without permitting the juices to be supplied so rapidly that they flow out the bottom end of the drum, through the discharge opening 36, without first being subjected to the freezing action of the walls of the drum.

Disposed immediately below the discharge opening 36 is the inclined perforated member 38 on which the juices fall. The liquid portion of the juices passes through the member 38 or drainboard, into the funnel-like arrangement at 40 which discharges the said juices into the receiving tank 42. The ice which may fall out the bottom of drum 12 through discharge opening 36 is caught by drainboard 38 and delivered therefrom into the ice trough indicated at 43 at the lower end of said drainboard.

It has been found that for ordinary juices a satisfactory freezing action will take place if drum 12 is maintained at about 25 degrees Fahrenheit. In some instances, as, for example, when the juice is heavily laden with acids or other freezing inhibitors, it may be necessary to somewhat reduce that temperature, but, in general, 25 degrees Fahrenheit can be considered the temperature at which the first stage of the concentration of the juice is carried out.

Periodically, the ice formed within the inside of drum 12 will have to be removed therefrom or else it will provide a blanket of insulation which will inhibit the proper freezing of the juices. This may be satisfactorily carried out in a number of different manners, but I prefer to supply to the space 22 a heated liquid which will cause an almost instantaneous warming of the surface of drum 12 which will melt the ice adjacent thereto, and either cause the ice to fall from the drum, or to permit it easily to be cracked off and dropped to the discharge opening 36 and onto drainboard 38, whence it passes to the ice trough 43.

It will be understood that the melting of the ice adjacent the surface of the drum 12 could be carried out by other means than the supplying of a heated fluid to space 22 if so desired. For example, there could be incorporated in drum 12 a suitable heating means, such as an electric heating element, and this employed for flash heating the drum in order to melt the ice immediately adjacent the drum surface. Similarly, the space between drum 12 and container 10 could be employed for receiving a heating medium for flash heating drum 12, and in this case the heating of the drum to permit the ice to be removed therefrom could be carried out without interrupting the refrigerating cycle.

In any case, it will be noted that the ice which is eventually removed from the inside of drum 12 is substantially free of any entrained juices so that no substantial loss of the juices being concentrated occurs. This renders the process highly economical and permits the product to be prepared and marketed at small cost.

In the second stage, the same cycle of operations obtains, and, for convenience, the various parts of the mechanism in stage 2 are numbered correspondingly to those in stage 1, except with the addition of a subscript a.

The fluid which is delivered to stage 2 is drawn from chamber 42 through a conduit 44 by pump 46 and discharged from the said pum into the conduit 30a leading through the valve 34a to spray head 32a.

The temperature at which stage 2 operates is preferably in the neighborhood of from 10 to 15 degrees Fahrenheit, the reduction in temperature over the temperature employed in the first stage of the process being necessary because the juices are now somewhat concentrated and must be carried to a lower temperature in order to cause the formation of ice crystals on the surface of drum 12a.

The concentrate discharged from stage 2 is collected in its chamber 42a, and it will be understood that this product is concentrated to a considerably higher degree than that which was collected in chamber 42 associated with the first stage.

The third stage of the system includes a mechanism similar to that already described, and, for convenience, the parts thereof are numbered the same as the corresponding parts of stages 1 and 2, but with the addition of a subscript b The temperature to which the drum is reduced in stage 3 may advantageously be from 3 to 5 degrees Fahrenheit, and at this temperature considerably more water will be extracted from the concentrate in the form of ice.

It will be noted that the same economy of operation as was referred to in connection with stage 1 is maintained in all three of the processing stages, so that the overall process is highly efficient in operation and has a minimum amount of carry-out of the juices with the ice.

It will also be evident that more or fewer stages than shown could be employed with the result that the juices could be carried to any degree of concentration desired.

Another feature of the arrangement of this invention is that when any one of the units of the three stages is taken out of the process for being de-iced, the others will continue in operation. This results in an economy of time and prevents the juices from being exposed to the atmosphere for too long a period which would have a deleterious effect on their taste and vitamin content.

While I have shown in the drawings drums having reduced sized discharge openings at the lower end, it will readily be apparent that these discharge openings could be the same size as the body part of the drum, if desired or necessary.

In certain instances, where the amount of water in the juice is very high and the ice film that forms on the drums is quite thick, it may be preferable to eliminate the reduced size discharge opening, and instead to carry the walls of the drum straight down, so that when the drum is flash heated, the cylinder of ice therein will fall freely to the bottom.

It has been mentioned that the drums 12, 12a and 12b are adapted for rotation on their axes. This rotation of the drums has a number of beneficial effects, among which are the even distribution of the substance being concentrated over the entire surface of the drum, thereby providing for the most efficient refrigerating action on the said fluid, also, the fluid is urged by centrifugal force against the surface of the drum and is thus caused at all times to be in intimate thermal contact therewith, and this further augments the freezing action of the refrigerated drum.

A still further beneficial effect is to be found in the fact that the apparent viscosity of the substance being concentrated will vary with the speed of rotation of the drum. Thus, if the substance being concentrated is quite thick and viscous, the speed of rotation of the drums can be slowed down. If, on the other hand, the substance being concentrated is very thin and watery, it may be preferable to rotate the drums at higher speed in order to cause the substance to move downwardly therethrough at a reduced rate and thus to expose the substance to the refrigerating action of the drum for the proper length of time.

It will be understood that I do not wish to be limited to the exact proportions, ratios, and other factors specifically set forth in the foregoing description and the accompanying drawings but desire to comprehend such changes thereof as may be further desirable to adapt my invention to different conditions and usages.

I claim:

1. In an apparatus for effecting the concentration of substances such as fruit and vegetable juices and the like by dehydration comprising: a substantially vertically disposed hollow cylindrical member having a discharge opening in the bottom end thereof, means in the upper end of said member for spraying the substance to be concentrated against the inner surface thereof, means for refrigerating said member, and means for rotating said member about its axis.

2. In an apparatus of the type described, a hollow cylindrical member disposed on a substantially vertical axis having a discharge opening in its bottom end, a spray head in the upper end of said member for the spraying therein of the substance to be concentrated, means for rotating said member on its axis, and means for alternately refrigerating and flash heating said member for bringing about the alternate freezing of ice therein and the loosening of the ice therefrom.

3. In an apparatus for concentrating substances by dehydration, a hollow substantially cylindrical member arranged on a vertical axis and having a discharge opening at its bottom end, means rotatably supporting said member, a spray head in the upper end of said member for spraying the substance to be concentrated therein, means for driving said member in rotation, and a container closely surrounding said member and adapted for having refrigerant passed therethrough to chill said member to the point of formation of ice on the inner surface thereof.

4. In an apparatus for the concentration of substances such as fruit and vegetable juices and the like by dehydration; a hollow cylindrical member disposed on a vertical axis and having a discharge opening in its lower end, means for driving said member in rotation, a conduit extending into the upper end of said member substantially on its axis and including a spray head whereby the substance to be concentrated can be sprayed in a fine mist onto the inner surface of said member, means surrounding said member for refrigerating it to a temperature where ice will form on its inner surface, and means beneath said member for collecting the unfrozen part of the substance which flows downwardly therethrough and out the said discharge opening.

5. In an apparatus for the concentration of substances such as fruit and vegetable juices and the like by dehydration; a hollow cylindrical member disposed on a vertical axis and having a discharge opening in its lower end, means for driving said member in rotation, a conduit extending into the upper end of said member substantially on its axis and including a spray head whereby the substance to be concentrated can be sprayed in a fine mist onto the inner surface of said member, means surrounding said member for refrigerating it to a temperature where ice will form on its inner surface, means beneath said member for collecting the unfrozen part of the substance which flows downwardly therethrough and out the said discharge opening, and a perforated drainboard arranged between said member and said collecting means for deflecting ice particles from said collecting means.

6. In an apparatus for the concentration of substances such as fruit and vegetable juices and the like by dehydration; a plurality of stages, each said stage comprising a vertically disposed drum having a spray head in its upper end for the spraying into the said drum of the substance to be concentrated and having a discharge opening in its lower end, collecting means disposed beneath each said discharge opening, means for introducing the substance to be concentrated into the upper end of the drum of the first stage, means for successively conveying the discharge from the first and each succeeding stage to the spray head of the next following stage, and means for drawing off from the collecting means for the last stage the concentrated product, each said stage including refrigerating means for its associated drum member.

7. In an apparatus for concentrating substances such as fruit and vegetable juices and the like by dehydration; a plurality of vertically arranged drum members, means for introducing the substance to be concentrated into the upper end of the first of said drum members, and for withdrawing the concentrated substance from the lower end of the last of said drum members, means providing for a serial flow of the substance being concentrated through said drums, and means for refrigerating said drums to cause the formation of ice therein to effect the said concentration, the first of said drums being refrigerated to a temperature of substantially 25 degrees Fahrenheit and the last of said drums being refrigerated to a temperature of substantially 3 degrees Fahrenheit, and the drums being said first drum member and last drum being refrigerated to successively lower temperatures toward said last drum member.

8. In an apparatus for dehydrating substances such as fruit and vegetable juices and the like; a plurality of vertically disposed drums, a spray head in the upper end of each drum and a discharge opening in the bottom end of each drum, means refrigerating said drums to temperatures that decrease from the first of said drums to the last thereof, means for supplying the substance to be concentrated under pressure to the spray head of the first of said drums, means for successively conveying the discharge from each of said drums to the spray head of the next drum and under pressure, and means for rotating said drums on their axes.

9. In an apparatus for dehydrating substances such as fruit and vegetable juices and the like; a plurality of vertically disposed drums, a spray head in the upper end of each drum and a discharge opening in the bottom end of each drum, means refrigerating said drums to temperatures that decrease from the first of said drums to the last thereof, means for supplying the substance to be concentrated under pressure to the spray head of the first of said drums, means for successively conveying the discharge from each of said drums to the spray head of the next drum and under pressure, means for rotating said drums on their axes, and means for heating said drums to cause melting of the ice immediately adjacent the surface thereof so the ice film in the drum can readily be removed therefrom.

10. A method of dehydrating fruit and vegetable juices which comprises the steps of introducing the juice in the form of a spray into the uppermost section of a vertically disposed rotating chamber which is open at its bottom end, subjecting said juice spray to refrigeration concurrently as the same is sprayed into said chamber and flows downwardly therethrough and out the bottom thereof, subjecting said chamber to intermittent heating to remove ice crystals therefrom, and separating and recovering the concentrated juice from said ice crystals.

11. A method of dehydrating fruit and vegetable juices which comprises the steps of introducing the juice in the form of a spray into the uppermost section of a vertically disposed rotating chamber which is open at its bottom end, subjecting said juice spray to refrigeration concurrently as the same is sprayed into said chamber and flows downwardly therethrough and out the bottom thereof, subjecting said chamber to intermittent heating to remove ice crystals therefrom, said juice being subjected to a plurality of spray refrigerating cycles, and separating and recovering the concentrated juice from said ice crystals formed during said cycles of refrigeration.

12. A method of dehydrating fruit and vegetable juices which comprises the steps of flowing the juice onto a moving surface, subjecting said moving surface to refrigeration concurrently as the same flows thereover whereby ice crystals of substantially pure water are formed in said juice, subjecting said moving surface to intermittent heating to remove said ice crystals therefrom, and separating and recovering the concentrated juice from said ice crystals.

*13. A method of dehydrating fruit and vegetable juices which comprises the steps of flowing the juice onto a moving surface, subjecting said moving surface to refrigeration concurrently as the same flows thereover whereby ice crystals of substantially pure water are formed in said juice, subjecting said moving surface to intermittent heating to remove said ice crystals therefrom, and separating and recovering the concentrated juice from said ice crystals, and delivering any liquid from said heating into the concentrated juice already extracted.*

References Cited in the file of this patent or the original patent

UNITED STATES PATENTS

| | | |
|---|---|---|
| 893,006 | Monti | July 14, 1908 |
| 1,359,911 | Oman | Nov. 23, 1920 |
| 2,221,212 | Wussow et al. | Nov. 12, 1940 |
| 2,340,721 | Whitney | Feb. 1, 1944 |
| 2,588,337 | Sperti | Mar. 11, 1952 |